(12) United States Patent
Ohmura et al.

(10) Patent No.: US 9,743,677 B2
(45) Date of Patent: Aug. 29, 2017

(54) WHEAT FLOUR FOR FRYING BATTER

(71) Applicant: NISSHIN FOODS INC., Tokyo (JP)

(72) Inventors: Masato Ohmura, Tokyo (JP);
Yasuyuki Yoshioka, Tokyo (JP);
Michihiro Sakakibara, Tokyo (JP);
Shinichi Fukudome, Saitama (JP);
Koji Ishizuka, Saitama (JP); Satomi Nozaki, Saitama (JP); Miwa Takahashi, Saitama (JP)

(73) Assignee: NISSHIN FOODS INC., Tokyo (JP)

( * ) Notice: Subject to any disclaimer, the term of this patent is extended or adjusted under 35 U.S.C. 154(b) by 0 days.

(21) Appl. No.: 15/025,393

(22) PCT Filed: Feb. 26, 2014

(86) PCT No.: PCT/JP2014/054721
§ 371 (c)(1),
(2) Date: Mar. 28, 2016

(87) PCT Pub. No.: WO2015/056457
PCT Pub. Date: Apr. 23, 2015

(65) Prior Publication Data
US 2016/0205950 A1 Jul. 21, 2016

(30) Foreign Application Priority Data
Oct. 18, 2013 (JP) ................... 2013-217019

(51) Int. Cl.
| | |
|---|---|
| *A21D 6/00* | (2006.01) |
| *A21D 2/16* | (2006.01) |
| *A23P 20/12* | (2016.01) |
| *A23L 5/10* | (2016.01) |
| *A23L 29/10* | (2016.01) |
| *A23L 29/225* | (2016.01) |
| *A23L 7/157* | (2016.01) |

(52) U.S. Cl.
CPC ............... *A21D 2/16* (2013.01); *A23L 5/11* (2016.08); *A23L 7/157* (2016.08); *A23L 29/10* (2016.08); *A23L 29/225* (2016.08); *A23P 20/12* (2016.08); *A23V 2002/00* (2013.01)

(58) Field of Classification Search
CPC ........ A23P 20/10; A23L 29/10; A23L 29/225; A23V 2200/222

USPC ............... 426/622, 601, 520, 523, 438, 654
See application file for complete search history.

(56) References Cited

U.S. PATENT DOCUMENTS 5,874,122 A 2/1999 Ueki et al.

FOREIGN PATENT DOCUMENTS

| | | |
|---|---|---|
| JP | 62-285761 | 12/1987 |
| JP | 06-237723 | 8/1994 |
| JP | 08-84568 | 4/1996 |
| JP | 09-191847 | 7/1997 |
| JP | 10-52232 | 2/1998 |
| JP | 11-69945 | 3/1999 |
| JP | 11-137198 | 5/1999 |
| JP | 11-318366 | 11/1999 |
| JP | 2000-069925 | 3/2000 |
| JP | 2000-125794 | 5/2000 |
| JP | 2002-065193 | 3/2002 |
| JP | 2003-235482 | 8/2003 |
| JP | 2007-117002 | 5/2007 |
| JP | 2013-141447 | 7/2013 |

OTHER PUBLICATIONS

Derwent week 200864, to JP 2003/235482, Fukutome et al., 2003, abstract only, p. 1.*
International Search Report, PCT/JP2014/054721, dated May 27, 2014.

* cited by examiner

*Primary Examiner* — Helen F Heggestad
(74) *Attorney, Agent, or Firm* — Young & Thompson

(57) ABSTRACT

A wheat flour for deep-fried food crusts is obtained by subjecting a mixture including a wheat flour and from 0.05 to 0.5 parts by mass of an emulsifier with respect to 100 parts by mass of the wheat flour to a heating treatment for 1 to 20 seconds under a condition where the temperature of the mixture is from 65 to 99° C. The emulsifier is at least one type of emulsifier selected from sucrose fatty acid esters and lecithin. The blending ratio of the emulsifier is preferably from 0.1 to 0.45 parts by mass with respect to 100 parts by mass of the wheat flour. The wheat flour has an average grain size of preferably less than 100 μm. A crust material for deep-fried foods including the aforementioned wheat flour for deep-fried food crusts, and a tempura flour including the aforementioned wheat flour for deep-fried food crusts are also described.

6 Claims, No Drawings

WHEAT FLOUR FOR FRYING BATTER

TECHNICAL FIELD

The present invention relates to a wheat flour for deep-fried food crusts that is useful as a crust material for deep-fried foods, such as tempura and kara-age, and more specifically, relates to a wheat flour for deep-fried food crusts that has excellent dispersibility in water and excellent workability, and that can provide a deep-fried food having a crust with a crispy texture.

BACKGROUND ART

Crusted deep-fried foods are deep-fried food products obtained by coating the surface of an ingredient with a crust material and deep-frying the coated ingredient by heating the same in oil. By deep-frying both the ingredient and the crust simultaneously in a balanced manner, the taste/flavor of the ingredient is condensed as a result of the ingredient being heated in a state where it is covered in a crust, whereas the crust is provided with a roasted-oil flavor and crispy texture as a result of moisture being evaporated by the high-temperature oil during deep-frying, and a synergy therebetween provides the deep-fried food with its characteristic flavor and texture. However, in order to obtain a deep-fried food having such characteristic flavor and texture, a person cooking the food needs to have reasonable experience in terms of e.g. temperature management of oil used for deep-frying, how to prepare and size the ingredient, the amount of batter/crust material to be applied, the viscosity and degree of mixing of the batter, etc. In ordinary households, etc., it is rare that deep-frying is performed with such experience, and thus, often, the crust becomes too thick and stiff, or the crust has a texture lacking crispiness.

Further, at the time of producing a deep-fried food, usually, a batter (slurry for crust) is prepared by mixing a crust material, which includes wheat flour as a main component, with water, and an ingredient is coated with the batter. However, wheat flour conventionally used for a crust material has poor dispersibility to water. Further, in a solution state, gluten included in wheat flour becomes viscous by forming a mesh structure with the lapse of time. Thus, it is impermissible to keep stirring the batter for a long time to improve dispersibility etc., and the batter needs to be used promptly after preparation. To address the above, wheat flours more suitable for crust materials have been proposed.

For example, Patent Literature 1 discloses a wheat granulated product for tempura having good flavor and texture even when reheated after being cooked, the wheat granulated product including a wheat flour and 0.01 to 0.5 parts by mass of an emulsifier with respect to 100 parts by mass of the wheat flour, and having an average grain size of from 100 to 180 μm. In relation to a process for producing this wheat granulated product for tempura, paragraph [0012] of Patent Literature 1 describes that a solution prepared by adding water to a mixture including a wheat flour and an emulsifier is granulated while being dried under conditions where the hot-air temperature is from 120 to 140° C. and the drying time is within 5 seconds. Further, Patent Literature 2 discloses a crust composition for deep-fried foods that includes a heat-treated wheat flour, oxidized starch, and a sucrose fatty acid ester. Paragraph [0011] of Patent Literature 2 describes that the heat-treated wheat flour is produced by heating wheat flour at a temperature from 80 to 120° C. for 20 to 90 minutes.

Patent Literature 3 discloses a heat-treated wheat flour for deep-fried foods wherein the starch included therein is substantially not pregelatinized, the gluten vitality is from 90 to 98% of untreated wheat flour, and the gluten swelling degree is from 105 to 155%. The heat-treated wheat flour for deep-fried foods disclosed in Patent Literature 3 does not include an emulsifier, and is produced by introducing wheat flour into a hermetically-sealed high-speed stirring machine which is in a pressurized state with saturated water vapor introduced therein, and subjecting the wheat flour to a heat-moisture treatment under conditions where the product temperature is from 65 to 80° C. and the residence time is from 2 to 20 seconds. Further, Patent Literature 4 discloses a wheat flour composition suitable for steamed food products, such as steamed buns or steamed bread, obtained by mixing a wheat flour and 0.1 to 2.0 parts by mass of an emulsifier with respect to 100 parts by mass of the wheat flour, and then subjecting the mixture to an indirect heating treatment under conditions where the product temperature is from 80 to 150° C. and the heating time is from 5 to 120 minutes. In the indirect heating treatment, heated water vapor is used as a heat source, and the heated water vapor is not directly applied to the mixture including the wheat flour and the emulsifier, but is applied to a container containing the mixture, and the mixture inside the container is heated indirectly.

The techniques disclosed in Patent Literatures 1 to 3 can provide deep-fried foods with favorable texture, but an even crispier texture is demanded of crusts of deep-fried foods. There is also a demand for a crust material, which is a raw material of a crust, having excellent dispersibility in water and excellent workability such as batter preparability, and capable of simplifying the labor of producing deep-fried foods.

CITATION LIST

Patent Literature

Patent Literature 1: JP 2000-69925A
Patent Literature 2: JP 2000-125794A
Patent Literature 3: JP H08-84568A
Patent Literature 4: JP 2007-117002A

SUMMARY OF INVENTION

A wheat flour for deep-fried food crusts of the present invention is obtained by subjecting a mixture including a wheat flour and from 0.05 to 0.5 parts by mass of an emulsifier with respect to 100 parts by mass of the wheat flour to a heating treatment for 1 to 20 seconds under a condition where the temperature of the mixture is from 65 to 99° C. The emulsifier is at least one type of emulsifier selected from sucrose fatty acid esters and lecithin. The present invention also relates to a crust material for deep-fried foods, or to a tempura flour, including the aforementioned wheat flour for deep-fried food crusts.

DESCRIPTION OF EMBODIMENTS

The present invention relates to: a wheat flour for deep-fried food crusts that has excellent dispersibility in water and excellent workability, and that can provide a deep-fried food having a crust with a crispy texture; and a crust material for deep-fried foods and a tempura flour that use the aforementioned wheat flour.

The wheat flour for deep-fried food crusts of the present invention includes at least a wheat flour and an emulsifier. The material wheat flour used as a raw material in the present invention may be any one of soft wheat flour (cake flour), medium-strength wheat flour (all-purpose flour), hard wheat flour (bread flour), or durum wheat flour, and one type of wheat flour may be used alone, or two or more types may be used in combination. Among the above, soft wheat flour and medium-strength wheat flour are particularly preferable.

The emulsifier used in the present invention is at least one type of emulsifier selected from sucrose fatty acid esters and lecithin. Emulsifiers other than the above may reduce dispersibility in water. The emulsifier used in the present invention may either be a powder or a liquid.

The blending ratio between the wheat flour and the emulsifier in the wheat flour for deep-fried food crusts of the present invention is from 0.05 to 0.5 parts by mass of the emulsifier, preferably from 0.1 to 0.45 parts by mass of the emulsifier, more preferably from 0.1 to 0.35 parts by mass of the emulsifier, with respect to 100 parts by mass of the wheat flour. If the amount of the emulsifier is less than 0.05 parts by mass with respect to 100 parts by mass of the wheat flour, dispersibility in water will deteriorate and the texture of the crust obtained by deep-frying will become sticky; whereas if the amount of the emulsifier exceeds 0.5 parts by mass with respect to 100 parts by mass of the wheat flour, the amount of oil absorbed by the crust obtained by deep-frying will increase, thus making the texture stiff.

The wheat flour for deep-fried food crusts of the present invention is obtained by subjecting a mixture, in which a wheat flour and an emulsifier have been blended at the aforementioned blending ratio, to a heating treatment for 1 to 20 seconds under a condition where the temperature of the mixture (product temperature) is from 65 to 99° C. If the product temperature of the mixture in the heating treatment is below 65° C., the crispy texture of the crust obtained by deep-frying will deteriorate; whereas if the product temperature is 100° C. or higher, the production step may become complicated, and excessive granulation of particles of the present deep-fried-food-crust wheat flour may occur. If excessive granulation of particles of the deep-fried-food-crust wheat flour occurs, the average grain size of the deep-fried-food-crust wheat flour will increase; as a result, the amount of oil absorbed by the crust obtained by deep-frying the deep-fried-food-crust wheat flour will increase, thus making the texture stiff. Further, if the heating time is less than 1 second or longer than 20 seconds, the crispy texture of the crust will deteriorate. In the heating treatment of the mixture including the wheat flour and the emulsifier, the product temperature of the mixture is preferably from 70 to 95° C., more preferably from 70 to 90° C. Further, the heating time for the mixture (the time for maintaining the product temperature) is preferably from 1 to 15 seconds, more preferably from 1 to 13 seconds.

As described above, the heating treatment for obtaining the wheat flour for deep-fried food crusts of the present invention is a mild treatment wherein the heating temperature (product temperature) is relatively low and the heating time is relatively short. Therefore, it is possible to suitably use superheated water vapor or saturated water vapor as the heat medium for the heating treatment. Stated differently, a preferred example of a method for subjecting a mixture, in which a wheat flour and an emulsifier have been blended at the aforementioned blending ratio, to a heating treatment for 1 to 20 seconds under a condition where the temperature of the mixture is from 65 to 99° C. (i.e., a method for producing a wheat flour for deep-fried food crusts of the present invention) is: directly applying superheated water vapor or saturated water vapor to the mixture to heat treat the mixture. More specifically, an exemplary method involves: mixing a wheat flour and an emulsifier at the aforementioned blending ratio; placing the mixture in a hermetically-sealed container that has been warmed with a warming means such as a jacket; and heating the mixture by blowing superheated water vapor or saturated water vapor into the hermetically-sealed container while stirring. Another preferred example of a method for producing the wheat flour for deep-fried food crusts of the present invention is to: continuously introduce a wheat flour and an emulsifier at the aforementioned blending ratio into a continuous powder transferring machine (hermetically-sealed high-speed stirring machine) that has a stirring-and-transferring mechanism and is warmed by a warming means such as a jacket, to stir and transfer the mixture; and, while stirring and transferring the mixture, introduce saturated water vapor at a high pressure into the machine, and heat and stir the mixture to a desired heating temperature for a desired heating time.

In the aforementioned heating treatment methods, the "temperature of the mixture in which a wheat flour and an emulsifier have been blended at the aforementioned blending ratio" according to the present invention may be the "product temperature of the wheat flour or the emulsifier during heating", or may be the "product temperature of at least one of the wheat flour and the emulsifier when they are discharged from the outlet of the hermetically-sealed container or the continuous powder transferring machine" (i.e., the temperature at the outlet). Further, the "heating time for the mixture" (the time for maintaining the product temperature of the mixture) according to the present invention may be the "time over which the mixture (the wheat flour and the emulsifier) is brought into contact with superheated water vapor or saturated water vapor", or may be the "residence time of the mixture within the machine".

It should be noted that, in relation to the heating treatment, it is preferable not to add water to the mixture of the wheat flour and the emulsifier before or during execution of the heating treatment. Adding water to the system including the mixture at this timing may cause excessive granulation of particles of the deep-fried-food-crust wheat flour that are ultimately obtained, and this may make it difficult to adjust the average grain size of the deep-fried-food-crust wheat flour within the desired range.

From the viewpoint of improving the crispy texture of the crust obtained by deep-frying the deep-fried-food-crust wheat flour, the average grain size of the deep-fried-food-crust wheat flour of the present invention obtained by allowing it to undergo the aforementioned heating treatment is preferably less than 100 µm, more preferably from 50 to 95 µm, even more preferably from 55 to 90 µm. It should be noted that, in the present Description, the average grain size of the wheat flour refers to the mean volume diameter measured according to the laser diffraction/scattering method using a particle size distribution measurement device.

Alternatively, as for the average grain size used in the present invention, the median diameter may also be employed. In this case, the average grain size of the deep-fried-food-crust wheat flour of the present invention is preferably from 30 to 85 µm, more preferably from 35 to 80 µm.

For the particle size distribution measurement device, a Microtrac MT 300011 (from Nikkiso Co., Ltd.) may be used, for example.

In order to set the average grain size of the deep-fried-food-crust wheat flour of the present invention within the aforementioned preferred range, it will suffice to use a material wheat flour having an average grain size ranging preferably from 35 to 80 μm, more preferably from 40 to 70 μm. For example, when using a material wheat flour having an average grain size of around 40 μm, the average grain size of the present deep-fried-food-crust wheat flour can be set within the aforementioned preferable range, even without particularly adjusting the particle size of the wheat flour subjected to the aforementioned heating treatment (i.e., the deep-fried-food-crust wheat flour according to the present invention). Further, for example, when using a material wheat flour having an average grain size of around 90 μm, the average grain size of the present deep-fried-food-crust wheat flour can be set within the aforementioned preferable range by pulverizing, as necessary, the wheat flour subjected to the aforementioned heating treatment, and then adjusting the particle size. A known method, such as sieving or a classifier, may be employed for the particle size adjustment method. It should be noted that the average grain size of the material wheat flour refers to the mean volume diameter measured with the aforementioned particle size distribution measurement device.

The crust material for deep-fried foods according to the present invention includes the aforementioned deep-fried-food-crust wheat flour of the present invention. The crust material for deep-fried foods according to the present invention may include only the aforementioned deep-fried-food-crust wheat flour of the present invention, or may include other components in addition to the deep-fried-food-crust wheat flour. For such other components, any component generally used in this type of deep-fried-food crust material may be used without particular limitation, with examples including sugars, cereal flours, starches, oils/fats, seasonings, aroma flavorings, eggs, thickening agents, emulsifiers, and table salt. One type of the aforementioned component may be used alone, or two or more types may be used in combination.

The crust material for deep-fried foods of the present invention is used as a crust material in producing deep-fried foods (crusted deep-fried food products), such as tempura, kara-age, fritters, croquettes, and cutlets. Stated differently, the crust material for deep-fried foods of the present invention encompasses, for example, tempura flours and kara-age flours including the aforementioned wheat flour for deep-fried food crusts of the present invention. When producing a deep-fried food by using the deep-fried-food crust material of the present invention, it will suffice to coat an ingredient with the deep-fried-food crust material, and then deep-fry the ingredient coated with the deep-fried-food crust material by, for example, frying the coated ingredient in oil or frying/sautéing the coated ingredient in a pan. Alternatively, an ingredient coated with the deep-fried-food crust material of the present invention may be stored or distributed, without being cooked, in a refrigerated, chilled, or frozen state, and then be cooked at a suitable timing. The deep-fried food obtained by using the deep-fried-food crust material of the present invention may be consumed as-is, or may be stored or distributed in a refrigerated, chilled, or frozen state, and then be re-heated and consumed at a suitable timing.

An ordinary method may be employed for the procedure of coating an ingredient with the deep-fried-food crust material of the present invention. For example, the deep-fried-food crust material of the present invention may be directly pressed or sprinkled onto an ingredient to coat the ingredient; or an ingredient may be coated in advance with e.g. a seasoning, a sprinkling flour, a beaten egg, and/or a batter (which may or may not include the deep-fried-food crust material of the present invention), and then the deep-fried-food crust material of the present invention may be pressed or sprinkled onto the ingredient to coat the ingredient. Alternatively, a batter including the deep-fried-food crust material of the present invention may be prepared, and then, an ingredient may be dipped into the batter, or the batter may be sprayed onto an ingredient, to coat the ingredient with the deep-fried-food crust material. A batter including the deep-fried-food crust material of the present invention can be prepared by mixing the deep-fried-food crust material with a liquid, such as water or an egg solution; for example, 50 to 200 parts by mass of water may be added and mixed with 100 parts by mass of the deep-fried-food crust material. The deep-fried-food crust material of the present invention has an extremely good dispersibility in water, and can thus be applied neatly and uniformly to an ingredient even by direct coating. Also, a suitably dispersed batter can be obtained without persistent stirring, and thus, a deep-fried food can be cooked extremely easily.

Ingredients for deep-fried foods produced by using the deep-fried-food crust material of the present invention are not particularly limited, and examples include: meat such as beef, pork, chicken, and mutton/lamb; seafood such as squid/cuttlefish, octopus, shrimp, salmon, mackerel, flatfish, and shells; cereals, vegetables, and root vegetables, such as soybean, rice, carrots, onions, pumpkins, potatoes, sweet potatoes, and mushrooms; and processed products of the above.

EXAMPLES

The present invention is described in further detail below by way of Examples. The present invention, however, is not limited to the following Examples.

Examples 1 to 5 and Comparative Examples 1 and 2

Soft wheat flour (Flour: product from Nisshin Flour Milling Inc.) was used as a wheat flour, and a sucrose fatty acid ester (Ryoto Sugar Ester S-770: product from Mitsubishi-Kagaku Foods Corporation) was used as an emulsifier, and the wheat flour and the emulsifier were blended in amounts shown in Table 1 below and were mixed uniformly, to obtain a mixture. The mixture was introduced into a hermetically-sealed high-speed stirring machine, and while introducing saturated water vapor into the stirring machine, the mixture was subjected to a heating treatment for 5 seconds under a condition where the heating temperature (temperature at the outlet) was 80° C. The mixture was dried after the heating treatment, to obtain a wheat flour for deep-fried food crusts according to each of Examples 1 to 5 and Comparative Examples 1 and 2. The average grain size of each deep-fried-food-crust wheat flour obtained as above was within the range from 61 to 77 μm.

Examples 6 to 11 and Comparative Examples 3 and 4

A wheat flour for deep-fried food crusts according to each of Examples 6 to 11 and Comparative Examples 3 and 4 was obtained in the same way as in Example 5, except that the product temperature of the mixture in the heating treatment was changed as appropriate. The average grain size of each deep-fried-food-crust wheat flour obtained as above was within the range from 61 to 77 μm.

Examples 12 to 16 and Comparative Examples 5 to 7

A wheat flour for deep-fried food crusts according to each of Examples 12 to 16 and Comparative Examples 5 to 7 was obtained in the same way as in Example 5, except that the heating time in the heating treatment was changed as appropriate. Further, a wheat flour for deep-fried food crusts according to Example 16 was obtained by pulverizing the deep-fried-food-crust wheat flour of Example 15 with a coffee mill.

Examples 17 to 19, Comparative Examples 8 and 9, and Reference Examples 1 and 2

A wheat flour for deep-fried food crusts according to each of Examples 17 to 19 and Comparative Examples 8 and 9 was obtained in the same way as in Example 5, except that lecithin (Lecion LP-1: product from Riken Vitamin Co., Ltd.) was used instead of a sucrose fatty acid ester as the emulsifier. Further, a wheat flour for deep-fried food crusts according to each of Reference Examples 1 and 2 was obtained in the same way as in Example 5, except that a sorbitan fatty acid ester (Poem O-80V: product from Riken Vitamin Co., Ltd.) was used instead of a sucrose fatty acid ester as the emulsifier. The average grain size of each deep-fried-food-crust wheat flour obtained as above was within the range from 58 to 91 μm.

Test Examples

Ten panelists were asked to prepare a batter by singly using the wheat flour for deep-fried food crusts according to each of the Examples and Comparative Examples, and to evaluate the dispersibility of each deep-fried-food-crust wheat flour in water according to the following evaluation criteria. The batter was prepared by adding and mixing 1.5 parts by mass of baking powder and 170 parts by mass of water with respect to 100 parts by mass of the wheat flour for deep-fried food crusts. Further, a sweet potato cut into a 1-cm wide, 1-cm thick, 5-cm long piece was dipped into and battered with each prepared batter and was deep-fried, to obtain a sweet potato tempura, which is a crusted deep-fried food product. Ten panelists evaluated the texture of each obtained sweet potato tempura according to the following evaluation criteria. The evaluation results (average score for ten panelists) are shown in Tables 1 to 4 below. It should be noted that Table 1 summarizes the effects that the sucrose fatty acid ester (emulsifier) has on the evaluation items, Table 2 summarizes the effects of the product temperature of the heated object (mixture of the wheat flour and the emulsifier) in the heating treatment, Table 3 summarizes the effects of the heating time in the heating treatment, and Table 4 summarizes the effects that lecithin or the sorbitan fatty acid ester (emulsifier) has on the evaluation items. In Tables 2 and 3, the results of Example 5 are also shown from the viewpoint of facilitating comparison.

Evaluation Criteria for Dispersibility in Water
5: Very good; dispersibility in water is extremely good.
4: Good; dispersibility in water is good.
3: Dispersibility in water is neither bad nor good.
2: Dispersibility in water is poor; slightly lumpy.
1: Dispersibility in water is very poor; lumpy.
Evaluation Criteria for Texture
5: Crust is very crispy and extremely crunchy.
4: Crust is crispy and crunchy.
3: Crust is slightly hard to crack, and is tough (stiff).
2: Crust is stiff and hard to crack.
1: Crust is extremely stiff and resilient, and has strong toughness.

TABLE 1

|  |  | Example | | | | | Comparative Example | |
| --- | --- | --- | --- | --- | --- | --- | --- | --- |
|  |  | 1 | 2 | 3 | 4 | 5 | 1 | 2 |
| Crust material | Soft wheat flour (parts by mass) | 100 | 100 | 100 | 100 | 100 | 100 | 100 |
|  | Sucrose fatty acid ester (parts by mass) | 0.05 | 0.1 | 0.35 | 0.45 | 0.5 | 0.02 | 0.8 |
| Heating treatment | Temperature (° C.) | 80 | 80 | 80 | 80 | 80 | 80 | 80 |
|  | Heating time (sec.) | 5 | 5 | 5 | 5 | 5 | 5 | 5 |
| Evaluation | Dispersibility in water | 3.5 | 4.4 | 4.4 | 4.5 | 4.4 | 2.2 | 4.3 |
|  | Texture | 3.8 | 4.7 | 4.7 | 4.6 | 4.4 | 3.2 | 2.8 |

TABLE 2

|  |  | Example | | | | | | | Comparative Example | |
| --- | --- | --- | --- | --- | --- | --- | --- | --- | --- | --- |
|  |  | 6 | 7 | 5 | 8 | 9 | 10 | 11 | 3 | 4 |
| Crust material | Soft wheat flour (parts by mass) | 100 | 100 | 100 | 100 | 100 | 100 | 100 | 100 | 100 |
|  | Sucrose fatty acid ester (parts by mass) | 0.5 | 0.5 | 0.5 | 0.5 | 0.5 | 0.5 | 0.5 | 0.5 | 0.5 |

TABLE 2-continued

|  |  | Example |  |  |  |  |  |  | Comparative Example |  |
|---|---|---|---|---|---|---|---|---|---|---|
|  |  | 6 | 7 | 5 | 8 | 9 | 10 | 11 | 3 | 4 |
| Heating treatment | Temperature (° C.) | 65 | 70 | 80 | 85 | 90 | 95 | 99 | 55 | 60 |
|  | Heating time (sec.) | 5 | 5 | 5 | 5 | 5 | 5 | 5 | 5 | 5 |
| Evaluation | Dispersibility in water | 3.7 | 4.3 | 4.4 | 4.7 | 4.6 | 4.4 | 4.2 | 2.8 | 3.2 |
|  | Texture | 3.6 | 4.2 | 4.4 | 4.6 | 4.7 | 4.5 | 4.2 | 1.9 | 2.5 |

TABLE 3

|  |  | Example |  |  |  |  |  | Comparative Example |  |  |
|---|---|---|---|---|---|---|---|---|---|---|
|  |  | 12 | 5 | 13 | 14 | 15 | 16 | 5 | 6 | 7 |
| Crust material | Soft wheat flour (parts by mass) | 100 | 100 | 100 | 100 | 100 | 100 | 100 | 100 | 100 |
|  | Sucrose fatty acid ester (parts by mass) | 0.5 | 0.5 | 0.5 | 0.5 | 0.5 | 0.5 | 0.5 | 0.5 | 0.5 |
| Heating treatment | Temperature (° C.) | 80 | 80 | 80 | 80 | 80 | 80 | 80 | 80 | 80 |
|  | Heating time (sec.) | 1 | 5 | 9 | 15 | 20 | 20 | 0.3 | 23 | 30 |
| Evaluation | Average grain size (μm) | 51 | 66 | 76 | 92 | 102 | 85 | 45 | 111 | 115 |
|  | Dispersibility in water | 4.0 | 4.4 | 4.5 | 4.2 | 4.0 | 4.1 | 2.6 | 3.6 | 3.3 |
|  | Texture | 4.1 | 4.4 | 4.6 | 4.4 | 3.6 | 4.3 | 2.0 | 2.7 | 2.1 |

TABLE 4

|  |  | Example |  |  | Comparative Example |  | Reference Example |  |
|---|---|---|---|---|---|---|---|---|
|  |  | 17 | 18 | 19 | 8 | 9 | 1 | 2 |
| Crust material | Soft wheat flour (parts by mass) | 100 | 100 | 100 | 100 | 100 | 100 | 100 |
|  | Lecithin (parts by mass) | 0.05 | 0.1 | 0.5 | 0.02 | 0.8 | — | — |
|  | Sorbitan fatty acid ester (parts by mass) | — | — | — | — | — | 0.1 | 1.0 |
| Heating treatment | Temperature (° C.) | 80 | 80 | 80 | 80 | 80 | 80 | 80 |
|  | Heating time (sec.) | 5 | 5 | 5 | 5 | 5 | 5 | 5 |
| Evaluation | Dispersibility in water | 3.2 | 4.2 | 4.2 | 2.0 | 4.1 | 2.9 | 3.0 |
|  | Texture | 3.5 | 4.5 | 4.1 | 2.9 | 2.4 | 2.6 | 2.5 |

As is clear from Table 1, in Comparative Examples 1 and 2, the amount of emulsifier (sucrose fatty acid ester) blended with respect to 100 parts by mass of the wheat flour was outside the aforementioned specific range (from 0.05 to 0.5 parts by mass), and thus, the Comparative Examples had lower ratings than the Examples in which the emulsifier blending amount was within the aforementioned specific range.

As is clear from Table 2, in Comparative Examples 3 and 4, the product temperature of the mixture, which included the wheat flour and the emulsifier, in the heating treatment for the mixture was outside the aforementioned specific range (from 65 to 99° C.), and thus, the Comparative Examples had lower ratings than the Examples in which the product temperature of the mixture was within the aforementioned specific range.

As is clear from Table 3, in Comparative Examples 5 to 7, the heating time in the heating treatment for the mixture, which included the wheat flour and the emulsifier, was outside the aforementioned specific range (from 1 to 20 seconds), and thus, the Comparative Examples had lower ratings than the Examples in which the heating time was within the aforementioned specific range. Further, from the comparison between Examples 15 and 16, it is understood that, by adjusting the average grain size of the deep-fried-food-crust wheat flour to less than 100 μm, the crispy texture of the crust can be improved while maintaining the dispersibility of the deep-fried-food-crust wheat flour in water at high levels.

As is clear from Table 4, Examples 17 to 19 and Comparative Examples 8 and 9, in which lecithin was used as the emulsifier, achieved results similar to those of the Examples (cf. Table 1) in which a sucrose fatty acid ester was used as the emulsifier, thus demonstrating that, also for lecithin, the effective blending amount is within the aforementioned specific range (from 0.05 to 0.5 parts by mass). On the other hand, as for Reference Examples 1 and 2 using a sorbitan fatty acid ester as the emulsifier, no noticeable effect was observed, even at blending amounts at which effects were observed for sucrose fatty acid esters and lecithin.

INDUSTRIAL APPLICABILITY

According to the present invention, it is possible to achieve excellent dispersibility in water and excellent workability, and to obtain a deep-fried food having a crust with a crispy texture.

The invention claimed is:

1. A method for producing a wheat flour for deep-fried food crusts, the method comprising:
subjecting a mixture including a wheat flour and from 0.05 to 0.5 parts by mass of an emulsifier with respect to 100 parts by mass of the wheat flour to a heating treatment for 1 to 20 seconds under a condition where the temperature of the mixture is from 65 to 99° C., wherein the emulsifier is at least one type of emulsifier selected from sucrose fatty acid esters and lecithin,
the heating treatment comprising directly applying superheated water vapor or saturated water vapor to the mixture to heat treat the mixture.

2. The method for producing wheat flour for deep-fried food crusts according to claim 1, wherein the wheat flour for deep-fried food crusts has an average grain size of less than 100 μm.

3. The method for producing wheat flour for deep-fried food crusts according to claim 2, further comprising making a crust material for deep-fried foods from the wheat flour.

4. The method for producing wheat flour for deep-fried food crusts according to claim 2, further comprising making a tempura flour from the wheat flour.

5. The method for producing wheat flour for deep-fried food crusts according to claim 1, further comprising making a crust material for deep-fried foods from the wheat flour.

6. The method for producing wheat flour for deep-fried food crusts according to claim 1, further comprising making a tempura flour from the wheat flour.

* * * * *